United States Patent

Berg

[15] 3,675,515
[45] July 11, 1972

[54] HIGH ENERGY IMPACT WRENCH ASSEMBLY

[72] Inventor: Louis L. Berg, Denham Springs, La.

[73] Assignee: Creative Tool Company, Denham Springs, La.

[22] Filed: Sept. 30, 1970

[21] Appl. No.: 76,731

[52] U.S. Cl. ............................................. 81/121, 81/52.3
[51] Int. Cl. .................................... B25b 13/06, B25b 19/00
[58] Field of Search ............... 81/52.3, 52.35, 57.39, 57.46, 81/121

[56] References Cited

UNITED STATES PATENTS

| | | |
|---|---|---|
| 3,273,428 | 9/1966 | Rudeke ................................. 81/52.3 |
| 3,272,035 | 9/1966 | Ekstrom et al. ....................... 81/52.3 |
| 3,211,028 | 10/1965 | Christensson ........................ 81/52.3 |
| 3,124,022 | 3/1964 | Corson ................................. 81/57.29 |

*Primary Examiner*—James L. Jones, Jr.
*Attorney*—Finnegan, Henderson, Farabow and Garrett

[57] ABSTRACT

A wrench assembly operated by a high energy impact for use on large nuts or bolts. The assembly includes a heavy housing and a lever mounted for limited rotation within the housing. Gripping means for engaging and transmitting torque to the nuts or bolts project outwardly of the housing from the axis of rotation of the lever. The tang of the lever is located adjacent an opening in the top wall of the housing so that a power hammer can be positioned over the opening to impart blows through the opening to the tang and to transmit high turning forces to the gripping means.

11 Claims, 5 Drawing Figures

INVENTOR
LOUIS L. BERG

BY Finnegan, Henderson & Farabow
ATTORNEYS

PATENTED JUL 11 1972 3,675,515

INVENTOR
LOUIS L. BERG

BY Finnegan, Henderson & Farabow
ATTORNEYS

HIGH ENERGY IMPACT WRENCH ASSEMBLY

This invention relates to impact driven wrenches and more particularly to a simplified wrench assembly operated by a high energy impact for loosening or tightening very large nuts or bolts and for turning very large valves.

Large nuts, bolts and the like are used in a variety of applications including, for example, the joining or fastening of access flanges, covers and housings commonly associated with high temperature furnaces, boilers, turbines, compressors, or steam and internal combustion engines. Other applications include earthmoving and dredging machinery, structural frame members, oil field refinery and mining equipment, pipe lines, railroad equipment and machinery, ship's engines and components, manufacturing plant equipment, metal working machinery and many other types of large machinery and equipment.

Nuts, bolts, and other threaded members when used in these and other applications are normally left in place for long periods of time, and in most cases, they are subjected to extreme environmental conditions, such as intense heat, corrosive atmospheres, oxidation, electrolysis, rusting, scaling, deformation by stress and the like.

Removal of such large nuts and bolts requires exceptionally large rotary torque forces. Often a two-step process has been required to loosen these large nuts or bolts. The first step is to break the bond between the nut and the bolt created by its exposure to the extreme conditions and the second step is to complete the removal by use of conventional impact wrenches operated with air, fluid, or by an electrical or other power source. In most instances in which nuts and bolts are particularly difficult to remove or loosen, the nuts and bolts are first loosened by manually applying impacts against rugged hammer wrenches. In many cases, continuous hammer blows against the wrenches are required for hours or even days before there is a break and an apparent loosening of the nut or bolt.

In the past, various types of power impact driven wrenches have been used, but these wrenches have often proved ineffective because of the large sizes of the nuts or bolts and because of the extremely high bonding forces that exist between the threaded members resisting the maximum force-imparting capability of the power source. Further, such power impact wrenches are usually constructed of many operating parts and employ various mechanical linkages making them susceptible to breakage and failure under heavy use.

In accordance with the present invention, a safe, simple, rugged and very versatile wrench assembly is provided for use with high energy linear impact driving means to produce exceptionally high rotary torque. The assembly comprises a housing having a pair of opposed parallel side walls with co-axially aligned first and second bores. An opening is further provided in a first end of the top wall of the housing.

A unitary lever member is rotatably mounted within the housing, said lever member including a first relatively large body portion located between the side walls of the housing, a pair of cylindrical shoulder portions integral with and on either side of the large body portion, and a tang integral with the large body portion and extending radially outwardly from the axis of the shoulder portions. The cylindrical shoulder portions are journaled within the side wall bores, and the relatively large body portion has at least one dimension greater than the diameters of the bores to permit rotary movement while substantially preventing axial movement of the lever member within the housing. The tang also is located adjacent the opening in the top wall of the housing.

In accordance with the invention, nut gripping means are further provided that project outwardly of the housing from a first one of the shoulder portions of the lever member in co-axial relationship with the bores whereby power hammer means can be positioned adjacent the opening in the top wall of the housing to impart linear blows through the opening to the tang and to provide high turning forces to the gripping means.

Preferably the nut gripping means comprise an extension integral with and extending outwardly from the shoulder portion and having a nut engaging port in its outer face for gripping the nut or bolt. Alternatively, the nut gripping means comprise an extension integral with and extending outwardly from the shoulder portion and an annular socket that is removably mounted to the extension.

In accordance with a preferred embodiment of this invention, nut gripping means also project outwardly from the second shoulder portion of the lever member and in co-axial relationship with the bores so the assembly can be used to both tighten or loosen nuts or bolts. Alternatively, one of the side walls of the housing is removable to permit removal and reversal of the lever member within the housing so that the wrench assembly can be used to either tighten or loosen the nuts or bolts.

Resilient means are also preferably provided within the housing for receiving the tang after each impact and for absorbing at least a portion of the energy impacted to the tang by the power hammer means.

The invention thus uses a minimum number of heavy and sturdy parts to provide a safe, reliable, efficient and very rugged device for tightening or loosening very large nuts or bolts.

It is to be understood that both the foregoing general description and the following detailed description are exemplary and explanatory only and are not restrictive of the invention.

Figure 1:
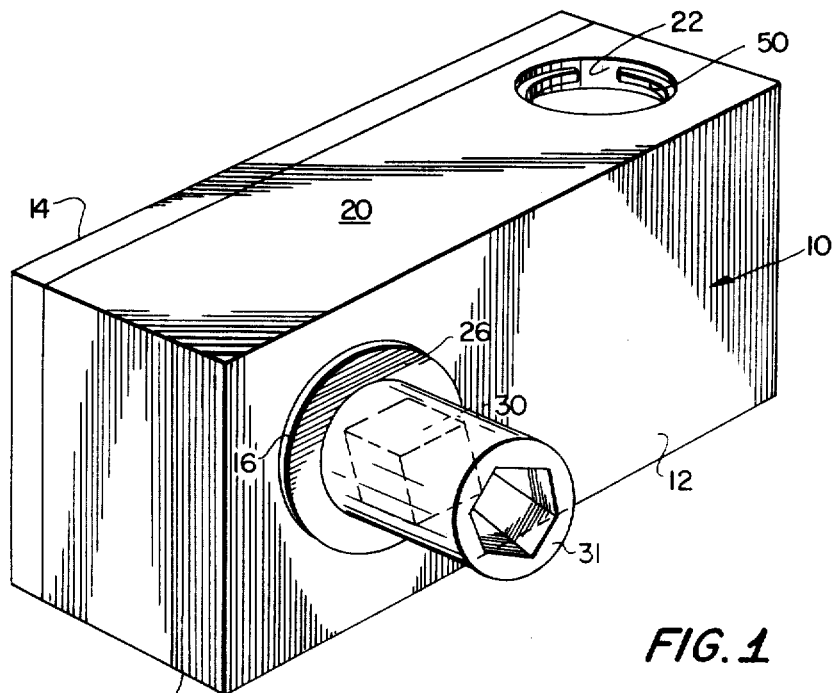
FIG. 1 is a perspective view of the wrench assembly of this invention.

With reference now to the drawings, wherein like reference characters designate like or corresponding parts throughout the several views, there is shown in FIG. 1 an embodiment of the invention which includes a heavy encasement or housing 10. The housing is preferably made of heavy steel plate and is generally rectangular in shape. The housing has two opposed parallel side walls 12 and 14 having co-axially aligned first and second bores 16 and 18, a top wall 20 having an opening 22 adjacent a first end of the top wall, and a bottom wall 23.

Figure 2:
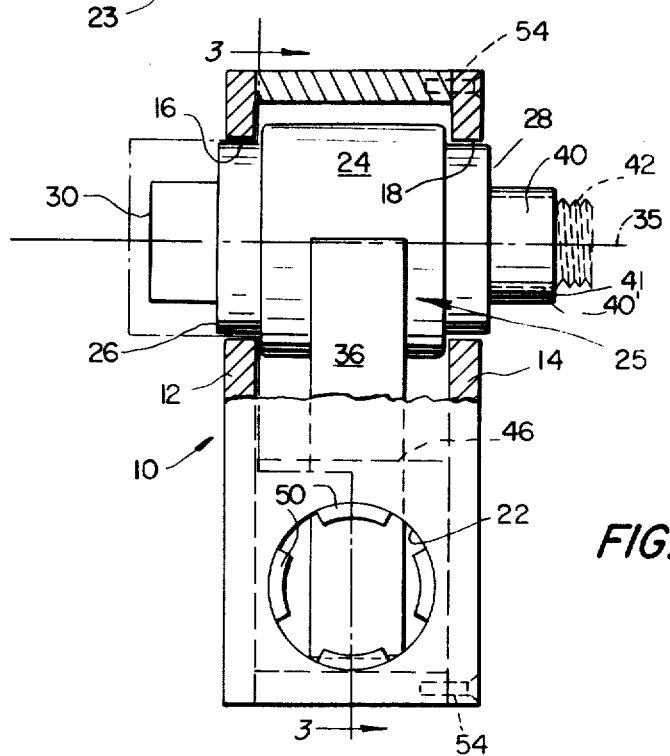
FIG. 2 is a top view partially in section of the assembly shown in FIG. 1 with the socket removed for clarity.
Figure 3:
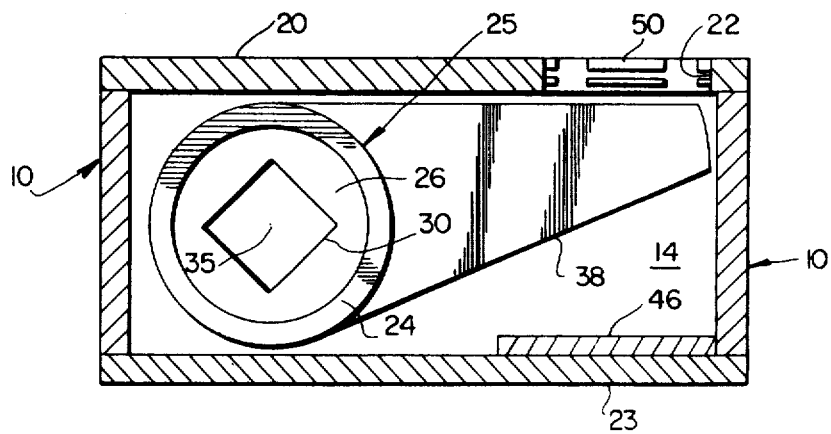
FIG. 3 is a broken sectional view taken along the line 3—3 of FIG. 2.

In accordance with this invention, a unitary lever member, generally 25 is mounted within the housing. As embodied, and as best shown in FIG. 2 and 3, a lever member 25 has a first relatively large body portion 24 positioned closely adjacent the inside of side walls 12 and 14 and between side wall bores 16 and 18. Body portion 24 of the lever member is preferably cylindrical in shape and has a diameter greater than the diameters of bores 16 and 18 to prevent any substantial movement of the lever member and body portion 24 along the axis of the bores. Although the body portion of the lever member is preferably cylindrical, it may also be square, triangular, or of other shape without departing from the principle of the invention. However, body portion 24 must have an outer dimension sufficient to permit it to rotate within housing 10 and without interference with the top and bottom walls of the housing.

The lever member also includes a pair of cylindrical shoulder portions 26 and 28 integral with and on either side of body portion 24 and journaled within bores 16 and 18, respectively, of the side walls of the housing. These shoulder portions are characterized by diameters substantially equal to but smaller than the respective diameters of bores 16 and 18 to permit the shoulder portions to rotate within the bores.

Although shoulder portions 26 and 28 of the lever member are shown journaled within bores 16 and 18, respectively, preferably the shoulders and bores are similar in size to permit reversal of the lever member within housing 10 so that shoulder portion 26 can be journaled within bore 18 and shoulder portion 28 can be journaled within bore 16. This provides the wrench assembly with the desirable feature of being able to tighten as well as loosen nuts or bolts and as will be more fully explained below.

In accordance with this invention, nut gripping means are provided that project outwardly from one of the shoulders of the lever member for engaging and transmitting torque to a nut or bolt in response to operation of the wrench assembly. As embodied and as shown in FIG. 2, the gripping means comprise a relatively small sized extension 30 that is integral with shoulder 26 and extends outwardly in a co-axial direction with the axis of bores 16 and 18. Extension 30 may take a variety of forms. Preferably, the extension remains small enough to pass through both bores 16 and 18 so the reversible feature of the wrench assembly is maintained, and the assembly can be used for either tightening or loosening nuts or bolts.

Extension 30 may, for example, be shaped for use with a removable socket 31 as shown in FIG. 1. This embodiment is best illustrated in FIGS. 2 and 3 where extension 30 is of square cross section for rotational connection with socket 31.

Figure 5:
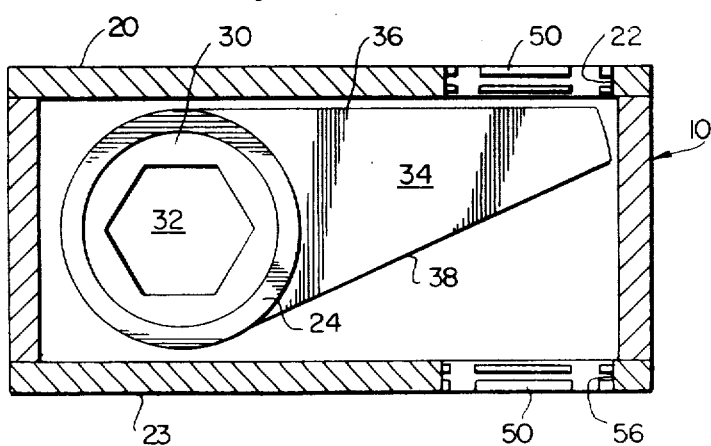
FIG. 5 is a sectional view similar to FIG. 3 and showing another embodiment of the invention.

In another embodiment of the invention as shown in FIG 5, extension 30 is itself shaped to engage the nuts and bolts. In this embodiment the extension has a hexagonal port 32 in its outer face so the extension can be placed directly over the nut or bolt to be tightened or loosened.

Clearly, numerous other shapes and configurations could be used for extension 30 in accordance with the invention such as one of hexagonal cross section whereby the wrench assembly could be used with Allen head-type bolts.

In accordance with the invention, a tang or shank 34 forms an integral part of the lever member and extends from body 24 in a radial direction with respect to the axis 35 of bores 16 and 18. The tang defines two substantially congruent faces 36 and 38, and the lever member is positioned within the housing such that when rotated to the top of its travel in the encasement, face 36 of tang 34 is located adjacent to and in substantially parallel relationship with the inside of top wall 20 and opening 22.

Figure 4:
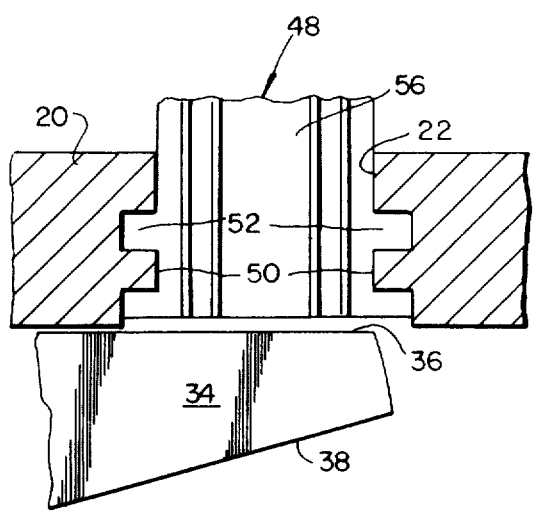
FIG. 4 is a fragmentary section of a portion of the assembly illustrating its relationship with a power hammer.

Power hammer means 48, partially illustrated in FIG. 4, can then be positioned adjacent opening 22 to impart a linear blow to tang 34 through the top wall opening to provide high rotational forces to the lever member and the nut gripping means, whereby the nut or bolt is tightened or loosened as desired.

In accordance with a preferred embodiment of the invention and as shown in FIG. 2, second nut gripping means are provided comprising a second relatively small sized extension 40 that projects outwardly from shoulder 28 in co-axial relationship with bores 16 and 18 and which is similar in shape to extension 30. Such an embodiment provides the advantage of enabling the wrench assembly to be used for both loosening and tightening without requiring that the lever member be removed from the encasement.

Further, extension 40 can be used as an anvil by providing a flat surface 41 for receiving impacts from a manual or power hammer to force the gripping means on extension 30 into position around a nut or into an annular socket wrench attachment.

Alternatively, and as shown in phantom in FIG. 2, extension 40' can have a threaded end 42 for securing any desired attachments to assembly such as an anvil cap or power impact means.

Housing 10 also includes a bottom wall 23, and in accordance with the invention resilient means are provided in contiguous relationship with at least a portion of the bottom side for receiving the tang and for absorbing at least a portion of the force of the tang as it moves in response to blows from the power hammer means. As here embodied, and as shown in FIG. 3, the resilient means is a damping plate 46 which is located beneath tang 34 and beneath hole 22 for damping the exceptionally large linear force created by downward movement of the tang after having been impacted by the power hammer. The damping plate provides an important safety factor by reducing rapid rotation of the encasement in response to the high energy downward movement of the tang. Thus, the wrench assembly is safe to use and injuries to the operator are minimized. The large mass of the encasement is also an important feature, and its high inertia reduces any rapid rotation of the encasement as a result of downward strokes of the tang. Further the encasement completely encloses the tang preventing any particles that might break off the tang from striking personnel during operation of the device.

With reference now to FIG. 4, there is shown the tip of a conventional power hammer means 48 positioned adjacent the top side of opening 22 and adjacent tang 34 of the lever member. In accordance with a preferred embodiment of the invention, locking means are provided for receiving and holding power hammer 48 in position to impart blows to the tang through top wall opening 22. As embodied and as shown in FIG. 4, the locking means comprise a plurality of lugs 50 spaced about the inner surface of opening 22 and matable with a plurality of corresponding lugs 52 spaced about the outer surface of the end of hammer 48 so that the hammer can be inserted into hole 22 with lugs 52 passing down between lugs 50. The hammer is then rotated a quarter turn to engage the lugs as shown in FIG. 4 and to hold the hammer in position closely adjacent to tang 34.

In operation of the wrench assembly in loosening nuts or bolts, the lever member is positioned within housing 10, as illustrated in FIG. 1. The wrench assembly is then manipulated so that the gripping means on extension 30 is placed in position over the nut or bolt. Power hammer 48 is inserted into hole 22 and is locked into position by lugs 52 and 50. The operator then uses the power hammer as a handle and rotates housing 10 as far as possible until face 36 of tang 34 contacts the inside of top wall 20 of the housing. Tang 34 is, thus, positioned immediately adjacent to power hammer 48.

The power hammer is then actuated in a conventional manner to send a plunger 56 against face 36 of tang 34 causing the tang to move downwardly and in a counterclockwise direction about the axis of bores 16 and 18. This movement of the tang exerts a rotary force on body 24 which in turn transmits the required loosening torque to the nut or bolt.

As tang 34 moves downwardly, it is received by damping plate 46 which absorbs at least some of the force of the tang as it moves in response to the blow from the hammer. Housing 10 is also preferably formed of heavy steel or other suitable heavy materials to provide a large mass and thereby furnish inertial braking to the forces transmitted to the housing by tang 34 as it strikes damping plate 46. Thus, the combination of damping plate 46 together with inertial braking of the heavy housing prevents the wrench assembly from spinning out of control in response to the hammer blow, making the assembly safer to use and minimizing the danger of injury to the operator. The cycle is then repeated until the desired loosening of the nut or bolt is accomplished.

When a nut or bolt is to be tightened, it is first tightened manually or by conventional power driven means until resistance overcomes the capabilities provided by such devices. When the wrench assembly is constructed in accordance with a preferred embodiment with both extensions 30 and 40 having nut gripping means, the whole wrench assembly is merely turned over so that the gripping means on extension 40 is placed in position over the bolt or nut. The same steps as outlined above for loosening nuts or bolts are then followed with the tang moving clockwise until the desired tightening of the nut or bolt is accomplished.

When the bolt or nut is to be tightened and lever member 25 has nut gripping means only on extension 30, side wall 14 is removed by removing screws 54 (FIG. 2) and lever member 25 is removed and reversed in the housing so that face 38 of tang 34 now lies adjacent the opening 22 in the housing. Thus, when the tang is hit by the power hammer means, it will rotate clockwise tightening the nut or bolt.

Alternatively, to tighten a nut or bolt a second opening 56 may be provided in bottom wall 23 of housing 10 opposite opening 22. The wrench assembly is then manipulated so that the gripping means on extension 30 is in position over the nut or bolt. The power hammer is then inserted into opening 56 and the housing rotated until the face 38 of tang 34 is adjacent the inside surface of bottom wall 23. Thus, an impact from the power hammer causes tang 34 and extension 30 to rotate in a clockwise direction to tighten the nut or bolt.

The invention thus provides a simply constructed and massive wrench assembly for use with power hammer means to loosen or tighten very large nuts or bolts.

The invention in its broader aspects is not limited to the specific details shown and described and departures may be made from such details without departing from the principles of the invention and without sacrificing its chief advantages.

What is claimed is:

1. A wrench assembly operated by high energy impacts including power operated hammer means comprising:
    a housing having two opposed parallel side walls with axially aligned bores adjacent one end of the housing and opposed, parallel top and bottom walls, said top wall having an opening therein spaced from the bores and adjacent the opposite end of the housing;
    a unitary lever member rotatably mounted within the housing about the axis of the bores for rotational movement between the top and bottom walls, said lever member having a relatively large body portion located between the side walls and adjacent the top and bottom walls and having at least one dimension greater than the diameters of said bores;
    a pair of cylindrical shoulder portions integral with and on either side of the large body portion, said shoulder being journaled within said bores;
    a tang extending radially outward from the axis of the large body portion, said tang having a pair of faces converging outwardly from the large body portion toward an outer end and shaped to lie adjacent to and in substantially parallel relationship with the inside of either the top or bottom wall when the lever is rotated within the housing, said outer end of the tang being located adjacent the opening in the top wall in operative position; and
    nut-gripping means projecting outwardly of the housing from a first one of said shoulder portions in co-axial relationship with the bores whereby power hammer means operating through the opening in the top wall imparts unrestricted, high-energy turning forces to the gripping means, said bottom wall limiting movement of the lever member to a short rotational distance within the housing substantially equal to the angular relationship between the two converging faces of the tang and substantially absorbing the energy from the power hammer means transmitted to the lever member.

2. The wrench assembly of claim 1, including nut gripping means also projecting outwardly of the housing from the second one of said shoulder portions in co-axial relationship with said bores.

3. The wrench assembly of claim 1, wherein said housing includes resilient means contiguous with at least a portion of the inside of said bottom that receives the tang and for absorbing at least some of the force of said tang as it moves in response to blows from the power hammer means.

4. The wrench assembly of claim 1, wherein one of said side walls is removably affixed to the housing and the lever member is reversible within the housing to permit the assembly to be used in nut-tightening or loosening positions.

5. The wrench assembly of claim 1, including a second opening in the bottom wall of the housing opposite said first opening to permit the assembly to be used in nut-tightening or loosening positions.

6. The wrench assembly of claim 1, wherein said nut-gripping means includes an extension integral with said first shoulder and having a nut-engaging port in its outer face.

7. The wrench assembly of claim 1, wherein said nut-gripping means includes an extension integral with said first shoulder and having a cross section compatible with an annular socket wrench attachment.

8. The wrench assembly of claim 1, further including locking means in said top wall opening for receiving and locking the power hammer means in position.

9. The wrench assembly of claim 8, wherein the locking means comprises a plurality of matable lugs on the power hammer means and in the top wall opening.

10. The wrench assembly of claim 1, wherein the width of the tang occupies a substantial portion of the distance between the parallel side walls of the housing.

11. The wrench assembly of claim 1, including end walls to provide a completely enclosed box-like housing.

* * * * *